(No Model.) 2 Sheets—Sheet 1.
L. S. CLARK.
TWO WHEELED VEHICLE.
No. 330,468. Patented Nov. 17, 1885.
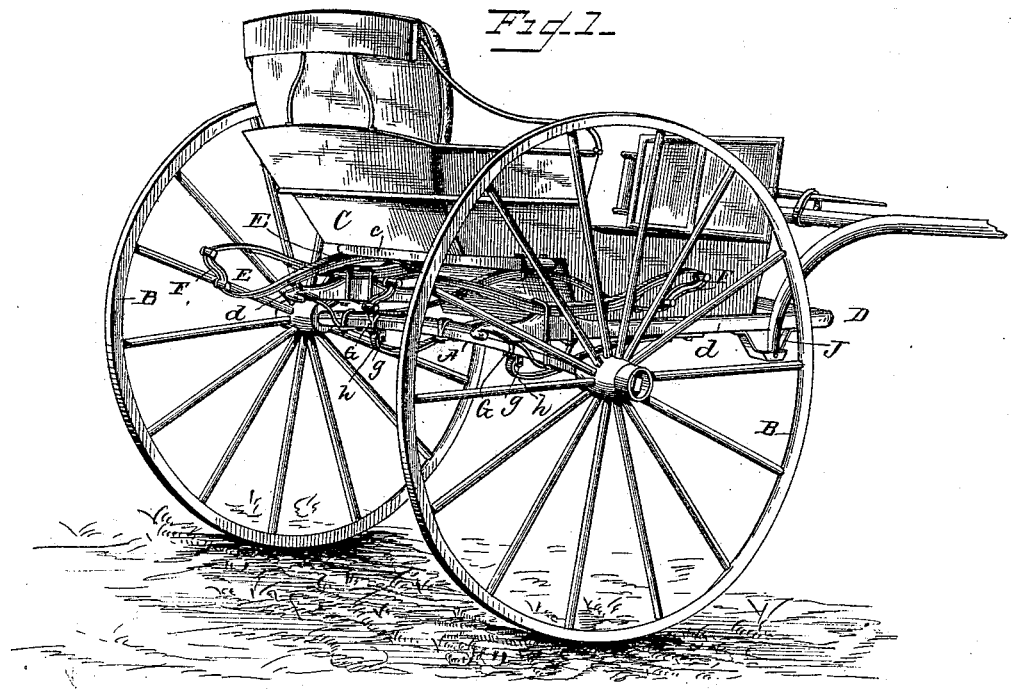
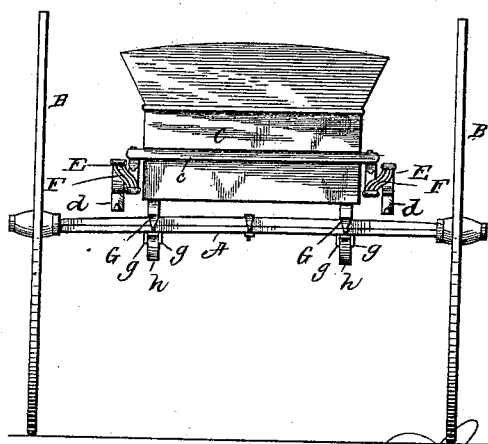
WITNESSES
F. L. Durand
F. B. Howes
Levi S. Clark,
INVENTOR
by J. R. Littell,
his Attorney.

(No Model.) 2 Sheets—Sheet 2.
L. S. CLARK.
TWO WHEELED VEHICLE.
No. 330,468. Patented Nov. 17, 1885.
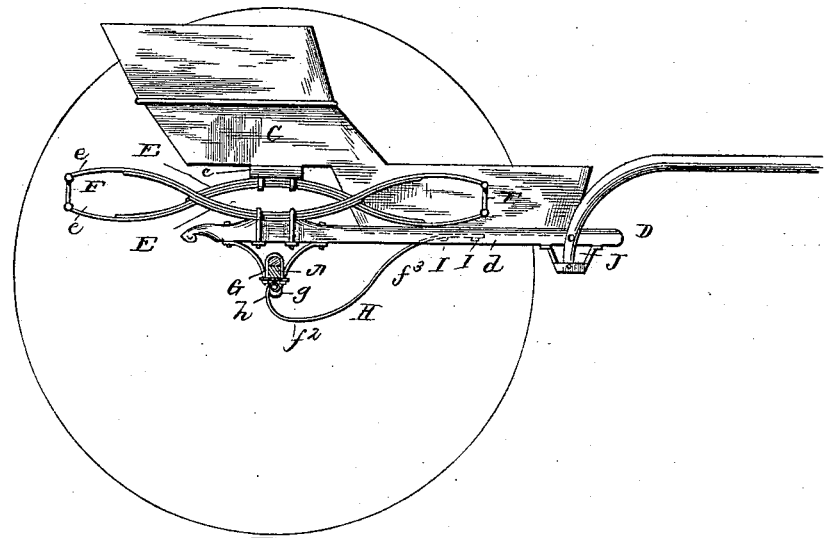
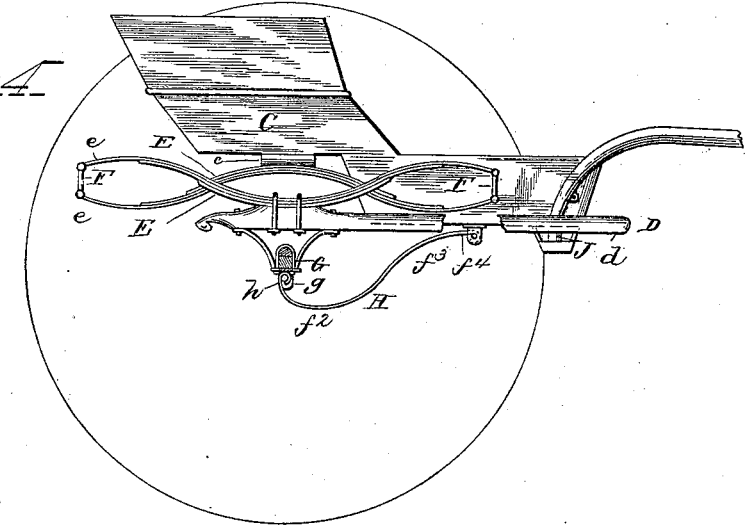
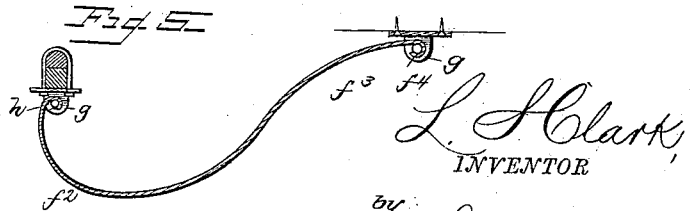
WITNESSES
L. S. Clark,
INVENTOR
by
his Attorney.

UNITED STATES PATENT OFFICE.

LEVI S. CLARK, OF DOYLESTOWN, OHIO, ASSIGNOR TO HIMSELF, ORRIN G. FRANKS, AND GEORGE T. BAUGHMAN, ALL OF SAME PLACE, AND JOHN H. WARREN, OF LODI, OHIO.

TWO-WHEELED VEHICLE.

SPECIFICATION forming part of Letters Patent No. 330,468, dated November 17, 1885.

Application filed September 11, 1884. Serial No. 142,793. (No model.)

*To all whom it may concern:*

Be it known that I, LEVI S. CLARK, a citizen of the United States, residing at Doylestown, in the county of Wayne and State of Ohio, have invented certain new and useful Improvements in Two-Wheeled Vehicles; and I do hereby declare that the following is a full, clear, and exact description of the invention, which will enable others skilled in the art to which it appertains to make and use the same.

This invention relates to two-wheeled vehicles or sulkies, and has special relation to an improved spring-reach coupling between the axle and body.

The object of my invention is to provide an improved vehicle of this class which will possess advantages in point of simplicity, inexpensiveness, durability, and general efficiency, and which will effectually obviate strain upon the springs, substantially as will be hereinafter fully set forth.

In the drawings, Figure 1 is a perspective view of a vehicle embodying my improvements. Fig. 2 is a rear view of the same. Fig. 3 is a detail side view showing the thills connected to the side bars of the frame. Fig. 4 is a corresponding view showing the thills connected directly to the body of the vehicle, and illustrating a modification in the spring-reach. Fig. 5 is a detail longitudinal sectional view.

Corresponding parts in the figures are denoted by the same letters of reference.

Referring to the drawings, A designates the axle of the vehicle, which carries the wheels B B, and upon which is mounted the body C. In the frame D of the vehicle are comprised side bars, $d\,d$, having their rear ends connected with or secured over the axle. The springs which support the body are secured upon the rear ends of the side bars and to a lateral projection, $c$, at the sides of the body. These springs comprise two semi-elliptical sections, E E, which are disposed at the side of one another, so that their ends $e$ cross, as illustrated in the drawings, and are connected by pivoted links F. By this relative arrangement of sectional springs secured, respectively, to the side bars and to the body, a free and easy action is secured.

Upon the axle A, near the inner side of the side bars, are secured clips G G, having arms or extensions $g\,g$ depending from the under side of the axle. Between these extensions are pivoted the rear ends, $h$, of the spring-reach couplings between the axle and body. A reach is provided for each side of the body, and they are formed by curved spring-plates having their rear ends pivotally connected to the clips upon the axle, from which the reach is bowed downwardly under the axle, as shown at $f^2$, and is then bowed upwardly and forwardly, as illustrated at $f^3$, its front end being secured to the bottom of the body by bolts I I, or in any other suitable manner.

The thills J J are pivotally connected at the front ends of the side bars, as shown in Fig. 3, in which case the spring-plates H H act as a support for the body, always retaining it in horizontal position, and also perform the office of an equalizer for the body and springs. When the thills are connected directly to the body, as seen in Fig. 4, the spring-plates perform the office of a reach and take the draft off the springs, so that all liability of breakage or damage to the springs is obviated.

A modification in the reach is also illustrated in Fig. 4, in which the spring-plates H are jointed to the body at their front ends, $f^4$, in lieu of being secured rigidly to the body by means of bolts or the like. In this arrangement it will be observed that the curved spring-plates have a knuckle-joint connection with both the under side of the axle and the body.

The operation and advantages of my invention will be readily understood by those skilled in the art to which it appertains. It is simple and inexpensive in construction, and the improved arrangement of the curved spring-reach secures a free and easy action and equalization, independent of the construction or form of springs.

I do not wish to be understood as limiting myself to the exact construction and arrangement of parts herein illustrated, as it is manifest that modifications in the form of springs and other parts may be resorted to without departing from the spirit and scope of my invention.

I claim as my invention and desire to secure by Letters Patent—

1. In an improved two-wheeled vehicle comprising the axle and body mounted upon the springs, the herein-described improved reach-plate having the pivotal connection with the under side of the axle, and curved upwardly and forwardly directly from its pivot to its straight front end portion, and secured to the body at its foremost end, substantially as and for the purpose set forth.

2. As an improvement in two-wheeled vehicles, the combination of the axle having clips secured near its ends, the body, and the springs supporting the same, and the curved spring-plates jointed at their rear end to the clips and curved forwardly, the front end of these reach-plates being secured to the under side of the body, substantially as set forth.

3. The combination of the axle having the clips secured near its ends and provided with the extensions at the under side of the axle, the body, the two-part semi-elliptical springs supporting the body, and having their sections respectively secured to the side bars and to the body, and connected at their ends by pivoted links, and the curved spring-reach plates having their rear ends pivoted between the extensions of the clips and secured at their front ends to the under side of the body, substantially as and for the purpose set forth.

In testimony whereof I affix my signature in presence of two witnesses.

LEVI S. CLARK.

Witnesses:
W. C. LYON,
W. R. PORTER.